United States Patent
Chen et al.

(10) Patent No.: US 9,137,720 B2
(45) Date of Patent: Sep. 15, 2015

(54) HANDOVER METHOD OF MULTICAST AND BROADCAST SERVICE BASED ON BUFFER FULLNESS

(75) Inventors: Jian Feng Chen, Beijing (CN); Jun Li, Cranbury, NJ (US); Yun Tao Shi, Beijing (CN); Ning Liao, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 407 days.

(21) Appl. No.: 13/520,550

(22) PCT Filed: Jan. 4, 2010

(86) PCT No.: PCT/CN2010/000003
§ 371 (c)(1),
(2), (4) Date: Jul. 3, 2012

(87) PCT Pub. No.: WO2011/079478
PCT Pub. Date: Jul. 7, 2011

(65) Prior Publication Data
US 2012/0320814 A1    Dec. 20, 2012

(51) Int. Cl.
*H04W 36/02* (2009.01)
*H04W 72/00* (2009.01)
*H04W 36/18* (2009.01)
*H04W 76/02* (2009.01)

(52) U.S. Cl.
CPC .......... *H04W 36/023* (2013.01); *H04W 72/005* (2013.01); *H04W 36/02* (2013.01); *H04W 36/18* (2013.01); *H04W 76/02* (2013.01)

(58) Field of Classification Search
CPC ............ H04W 36/0083; H04W 36/0094; H04W 36/02; H04W 36/026; H04W 36/20; H04W 36/24; H04W 36/045; H04W 36/30; H04W 36/36; H04W 72/005; H04W 76/02
See application file for complete search history.

(56) References Cited

U.S. PATENT DOCUMENTS

| | | | |
|---|---|---|---|
| 2004/0165530 A1* | 8/2004 | Bedekar et al. | 370/235 |
| 2005/0094618 A1 | 5/2005 | Colban et al. | |
| 2005/0265321 A1* | 12/2005 | Rappaport et al. | 370/352 |
| 2006/0026295 A1* | 2/2006 | Iwamura | 709/233 |
| 2006/0251130 A1* | 11/2006 | Greer et al. | 370/508 |
| 2008/0212509 A1 | 9/2008 | Kim et al. | |
| 2008/0225799 A1 | 9/2008 | Lee et al. | |

(Continued)

FOREIGN PATENT DOCUMENTS

| | | |
|---|---|---|
| CN | 1833460 | 9/2006 |
| CN | 101163334 | 4/2008 |

(Continued)

OTHER PUBLICATIONS

Search Rept:Oct. 21, 2010.

*Primary Examiner* — Benjamin Lamont
(74) *Attorney, Agent, or Firm* — Myers Wolin LLC (57) ABSTRACT

A method of a mobile station receiving data packets from a serving base station via a multicast or broadcast connection in a wireless network is provided for performing a handover from the serving base station to a target base station. The method comprises, at the level of the mobile station, the steps of: upon the detection of the quantity of buffered data packets in the mobile station being lower than a first threshold value, establishing a unicast connection with the serving base station to receive data packets from the serving base station; and upon detection of the level of buffered data packets reaching the predetermined threshold level, performing a handover from the serving base station to the target base station. According to the invention, a seamless handover of a mobile station in a wireless network providing Multicast and Broadcast Service (MBS service) can be achieved to prevent the MBS service interruption during the handover.

8 Claims, 6 Drawing Sheets

(56) References Cited

U.S. PATENT DOCUMENTS

| | | | |
|---|---|---|---|
| 2009/0129275 A1* | 5/2009 | Watanabe et al. | 370/235 |
| 2009/0323533 A1* | 12/2009 | Ohta | 370/236 |
| 2011/0026494 A1* | 2/2011 | Nagasawa et al. | 370/332 |
| 2011/0032832 A1* | 2/2011 | Jalali et al. | 370/252 |
| 2011/0205922 A1* | 8/2011 | Yokota | 370/252 |
| 2013/0279474 A1* | 10/2013 | Dimou et al. | 370/331 |

FOREIGN PATENT DOCUMENTS

| | | |
|---|---|---|
| EP | 1392075 | 2/2004 |
| EP | 1978762 | 10/2008 |
| EP | 2040492 | 3/2009 |
| KR | 1020040098189 | 11/2004 |
| KR | 1020080054074 | 6/2008 |
| KR | 1020080064741 | 7/2008 |
| WO | WO2005/034561 | 4/2005 |
| WO | 2006011763 | 2/2006 |
| WO | 2006091736 | 8/2006 |
| WO | WO-2008/046337 | 4/2008 |
| WO | 2008127037 | 10/2008 |
| WO | WO2009/067297 | 5/2009 |
| WO | 2009132673 | 11/2009 |

* cited by examiner

HANDOVER METHOD OF MULTICAST AND BROADCAST SERVICE BASED ON BUFFER FULLNESS

This application claims the benefit, under 35 U.S.C. §365 of International Application PCT/CN2010/000003, filed Jan. 4, 2010, which was published in accordance with PCT Article 21(2) on Jul. 7, 2011 in English.

FIELD OF THE INVENTION

The present invention relates generally to a multicast and broadcast service (MBS) in a wireless network, and more particularly, to a method of a mobile station receiving MBS data in a wireless network for performing a handover between base stations.

BACKGROUND OF THE INVENTION

MBS is a point-to-multipoint service transmitting data from a service source to a plurality of receivers through a common wireless channel. The IEEE802.16e-2005 standard has defined the MBS in a mobile WiMAX (Worldwide Interoperability for Microwave Access) network, which can be implemented as a cost-effective way to provide mobile TV or Video on Demand (VOD) services.

According to the definition in the IEEE802.16e standard, a multi-base-station MBS can be supported by constructing separate regions in the downlink frame.

Figure 1:
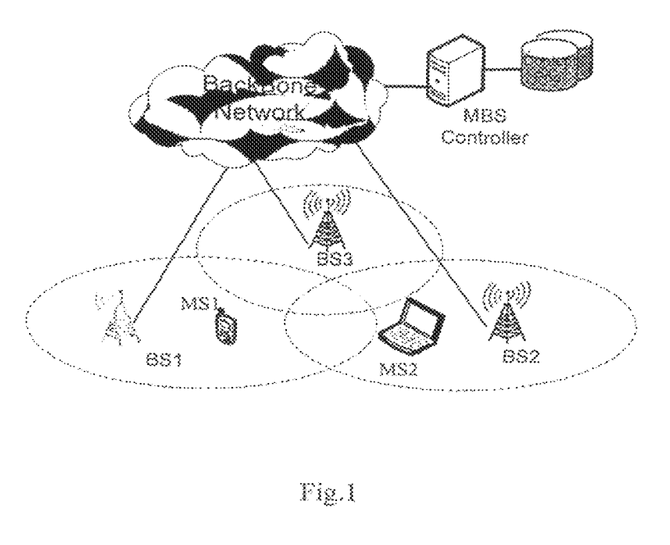
FIG. 1 is an exemplary diagram showing the network architecture of MBS over multiple BSs in the prior art.

FIG. 1 is an exemplary diagram showing the network architecture of multi-base-station MBS in a wireless network in the prior art. As shown in FIG. 1, a system for providing a MBS comprises a content pool, an MBS controller, a plurality of base stations (three, BS1, BS2 and BS3 in this example) and a plurality of mobile stations. The MBS controller provides the plurality of base stations with MBS data from the content pool and performs authentication of mobile stations and distribution of encryption key for the MBS. The plurality of base stations provide the plurality of mobile stations with the MBS data transferred from a backbone network through common air interface. The plurality of mobile stations receive the MBS data transmitted from the serving base station they connect.

For the access mode of multi-base-station MBS, a single frequency network (SFN) with flexible duration of MBS regions is employed to permit the scalable assignment of radio resources to MBS traffic. Each base station is capable of providing MBSs belonging to the same MBS zone where a set of base stations with the same connection index (CID) and the same security association (SA) are used for transmitting content of certain service flows. The multi-base-station MBS in SFN does not require a mobile station to register with a new base station during a roaming process, which can reduce a handover delay and a service broken.

To enable a mobile station to receive MBSs from a plurality of base stations, MBSs need to be strictly synchronized across these base stations. However, the synchronization of MBS among multiple base stations is hard to achieve because of the following four constrains: the identical Packet Data Unit (PDU) format and CID assignment; the identical Orthogonal Frequency Division Multiple Access (OFDMA) frame; the identical OFDMA data region; and the identical channel coding scheme.

Except for the overhead for the content synchronization such as functions of classification, fragmentation and centralized scheduling, there are the following drawbacks for deployment of MBS in SFN.

(1) Waste of MBS Bandwidth

As long as a MBS zone is created, a multicast service that starts up inside one base station should be extended to all base stations belonging to the same MBS zone. Obviously, for some non-popular programs with limited subscribers located inside a small amount of base stations, the bandwidth will be wasted in the cell where there is no subscriber for this program.

(2) No Flexibility for Link Adaption Among Multiple Base Stations

How to fulfil a link adaption for MBS in a single-base-station access is a challenging task because of the great amount of overhead for feedback channel maintenance. It is nearly impossible to have the link adaption among multiple base stations since there is a remarkable variation of subscriber distribution. Accordingly, the conventional method skips the link adaption and chooses the most robust (fixed) modulation and coding scheme for MBS. The disadvantage is that the system utility will be reduced a lot due to the poor spectrum efficiency of low level modulation and coding scheme.

(3) Affection on Unicast Service

Normally, the MBS will cover partial downlink sub-frame. And in a WiMAX system, a base station needs to allocate uplink transmission opportunity for a mobile station when there is traffic originating from the mobile station. It is difficult for the base station to assign a symbol and a subchannel for a unicast service in the SFN because of the unpredictable interference from neighboring base stations operating in the same frequency band. As shown in the FIG. 1, there are overlapping areas among neighboring base stations BS1, BS2 and BS3 in the backbone network. For those mobile stations located in these overlapping areas, the transmission of unicast service to/from its serving base station is inevitably interfered with the unitcast traffic in the area of the neighboring base stations. Thus the overall system utility will also be affected.

A multiple frequency network (MFN) is another approach for multi-base-station access. Although the MFN can overcome the above described disadvantages of the SFN, a distinct challenge is the uncertain handover processing time during the course of a mobile station switching from one base station to another. In such case the mobile station needs to terminate the existing connection with the serving base station, go through the network entry procedure and then re-establish the service connection with a new base station. Because the content synchronization is not a mandatory requirement in MFN environment, even the content source is from the same MBS controller via the backbone network, the delay from MBS controller to each base station might be different. Thus the following two problems should be considered for the MBS handover process in WiMAX network:

(1) Minimizing the switching time for handover (2) Minimizing the service interruption.

For the problem 1, there are some mechanisms already defined in the IEEE802.16e standard to reduce the switching time. For example, according to one mechanism, if a mobile station have previously received neighboring advertisement message from its serving base station, it can acquire the information including the ID, the physical frequency and the downlink/uplink channel description of the candidate target base station. Thus the synchronization to the target base station can be achieved in a quick way. Furthermore, the network re-entry proceeds may also be shortened if the target base station can possess information of the mobile station from the serving base station over the backbone network, by which the authentication and registration phases can be skipped.

For the problem 2, there is no method mentioned in the IEEE802.16e standard for data and service integrity. A mobile station must terminate the connection with the serving base station before the handover processing. No function model is defined for the base station to support seamless MBS handover in MFN mode.

Full information of the MBS in a mobile WiMAX network cab be referred by the IEEE802.16e standard.

In summary, the current definition in the IEEE802.16e standard uses the SFN for multicast and broadcast service among multi-base station access. However, such method will not only bring great overhead for content and frame synchronization among base stations grouped in the same MBS zone, but also cause bandwidth waste and efficiency descending for unicast services. By contrast, the MFN as described above can reduce overhead for content synchronization and minimize the interference for unicast services in the cell boundary and overlapping area. But the major problem of the MFN is the possible interruption of service during the handover processing when switching from one base station to another.

Therefore, the problem of an efficient and seamless MBS handover for multi-base-station access in MFN needs to be addressed.

SUMMARY OF THE INVENTION

According to one aspect of the invention, a method of a mobile station receiving data packets from a serving base station via a multicast or broadcast connection in a wireless network is provided for performing a handover from the serving base station to a target base station. The method comprises, at the level of the mobile station, the steps of: upon the detection of the quantity of buffered data packets in the mobile station being lower than a first threshold value, establishing a unicast connection with the serving base station to receive data packets from the serving base station; and upon detection of the level of buffered data packets reaching the predetermined threshold level, performing a handover from the serving base station to the target base station.

BRIEF DESCRIPTION OF DRAWINGS

These and other aspects, features and advantages of the present invention will become apparent from the following description in connection with the accompanying drawings in which.

DETAIL DESCRIPTION OF PREFERRED EMBODIMENTS

In the following description, various aspects of an embodiment of the present invention will be described. For purposes of explanation, specific configurations and details are set forth in order to provide a thorough understanding. However, it will also be apparent to one skilled in the art that the present invention may be practiced without the specific details present herein.

Figure 2:
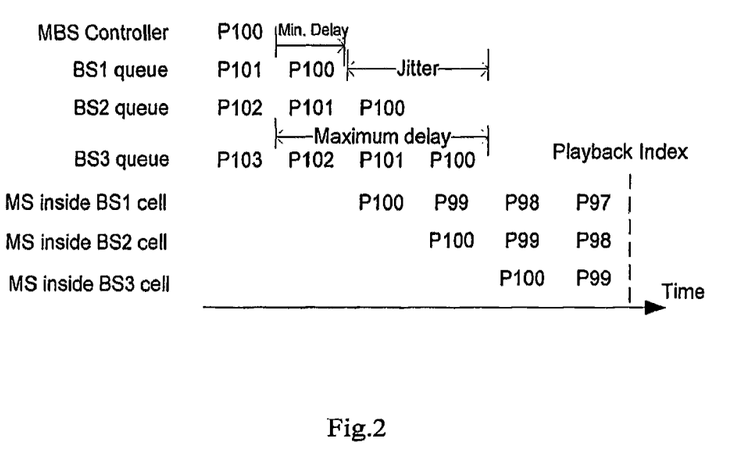
FIG. 2 is a diagram showing an example of a MBS service flow in a WiMAX network.

FIG. 2 is a diagram showing an example of a MBS service flow in a WiMAX network providing MBS with the network infrastructure as shown in FIG. 1, wherein MBS data (TV programs in this case) is transmitted from a MBS controller to three base stations BS1, BS2 and BS3 in the network. As shown in FIG. 2, the first base station BS1 has the shortest network delay and the third base station BS3 has the longest network delay. The variation of the network delay is caused by the different transmission paths in the backbone network and different queue depths of respective base stations.

Some existing protocols can be deployed to transmit information on the network delay. For example, the real-time transport control protocol (RTCP) can be used to collect end-to-end information about the quality of the session to each base station. The required information, such as the first packet index, the current queue depth and the maximum available queue length, can be encapsulated in the receiver report in RTCP packet. Since the MBS controller is the sole source point for a MBS program, the content type and the normal playback rate is already known by comparing the first packet index among different queues. The network delay jitter among all base stations or between neighboring base stations can be periodically monitored.

Considering the variation of handover time consumption, each mobile station that successfully finishes the handover will report its handover time consumption and previous serving base station during the registration with a target base station. Thus a base station may collect such information as average/maximum/minimum handover intervals, and periodically report to the MBS controller. Together with the network delay jitter, MBS controller will broadcast time-relating information through control message to keep each base station updated. At the same time, the MBS controller will calculate a bottom line of the queue length of a base station. One example of the equation for the calculation can be the following equation:

$$Q.\text{bottom} = e * (T.\text{jitter} + T.ho) * R.\text{service}$$

wherein e is an exponent to rectify the inaccuracy of the estimation, R.service is the average sending rate, T.jitter is the estimation of the time difference of buffered data between neighboring base stations and T.ho is the estimated handover time between neighboring base stations:

The following tables I and II shows the items definition and the sample case for the first base station BS1.

TABLE I

| | | Network Delay Jitter (T.jitter) | |
|---|---|---|---|
| Service ID | Serving base station | Neighboring base stations | Value (ms) |
| Service1 | BS1 | BS2 | +50 |
| | | BS3 | −40 |
| Service2 | BS1 | BS2 | +100 |
| | | BS3 | −20 |
| ... | | ... | ... |
| ServiceN | BS1 | BS2 | −80 |
| | | BS3 | +60 |

TABLE II

| Average handover time consumption(T.ho) | | |
| --- | --- | --- |
| Serving base station | Neighboring base stations | Value (ms) |
| BS1 | BS2 | 500 |
|  | BS3 | 200 |

It can be appreciated that in the table I a positive number of the jitter value means a service flow has a higher network delay than that in a neighboring base station, while a negative number means the service flow has a lower network delay.

It should be noted that, in an access network, a base station can forward the above described information to each of its mobile station after receiving average handover time consumption information from the neighboring base station.

Figure 3:
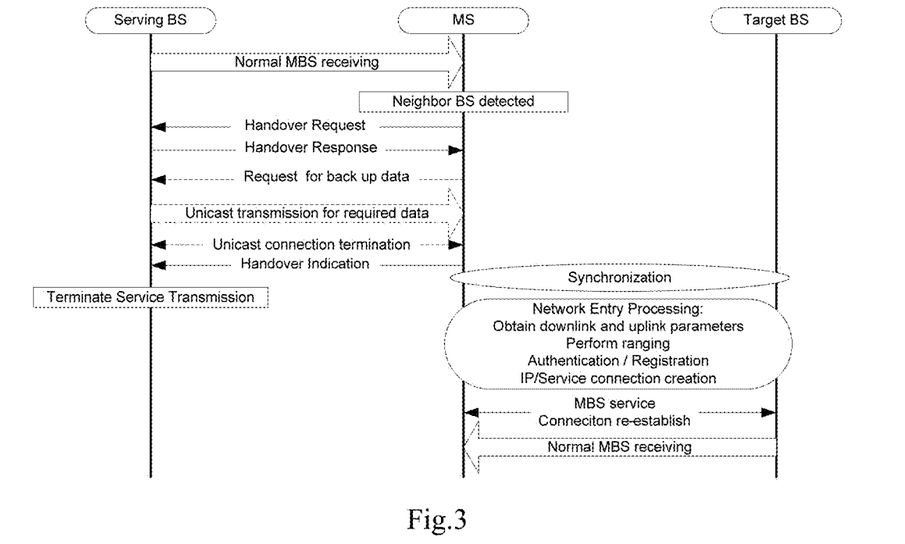
FIG. 3 is a flow chart showing the handover processing of a MBS according to an embodiment of the invention.

FIG. 3 is a flow chart showing the MBS handover procedure of a mobile station according to an embodiment of the invention.

As shown in FIG. 3, the handover procedure of a mobile station from its serving base station to a target base station comprises the following steps:

(1) Neighboring Base Station Detection

The mobile station will scan one or more of its neighboring base stations in order to determine their suitability for the handover from its serving base station. The serving base station may schedule scanning intervals or sleep intervals to conduct cell reselection.

(2) Handover Decision and Initiation

The mobile station will shake hands with the serving base station by request and response message exchanges to inform the serving base station of its handover decision.

(3) Backup Data Request

The mobile station will compare its local data buffer length with the value of the sum of the network delay jitter plus the average handover time consumption (T.jitter+T.ho). If there is no enough data to use during the time of this value, the mobile station will send a data request to the serving base station to request for a certain amount of backup data through a unicast transmission. As one example, the amount of backup data can be calculated by the following equation:

$$Q.\text{request} = f^*(T.\text{jitter} + T.\text{ho}) - B.\text{local},$$

wherein f is an exponent to rectify the inaccuracy of estimation value and B.local is the buffer length of the mobile station.

The backup data request can be indicated as an urgent request before the handover so that the mobile station can get the data transmission with a higher priority. This unicast connection can be terminated as soon as the requested data transmission is finished.

(4) Handover Indication

After receiving the requested data, the mobile station will send an indication to the serving base station which can then terminate the corresponding MBS connection to the mobile station.

(5) Synchronization with the Target Base Station

The mobile station will select one of the target base stations for negotiation and synchronization.

(6) Network Entry Processing

The mobile station will enter into the MBS service of the new base station with a network entry procedure which may include, for example, parameter acquiring, ranging, authentication, registration, IP and service connection creation.

Among the steps mentioned above, the steps 1, 2, 4, 5 and 6 are routing handover processes defined in the standard while the step 3 is newly introduced (shown by dash line in FIG. 3). The object of the step 3 is to insert a proper amount of backup data packets into the local buffer of the mobile station. These backup data packets can be used by the mobile station for playback during the normal handover procedure to reduce possibility of a service broken.

Figure 4:
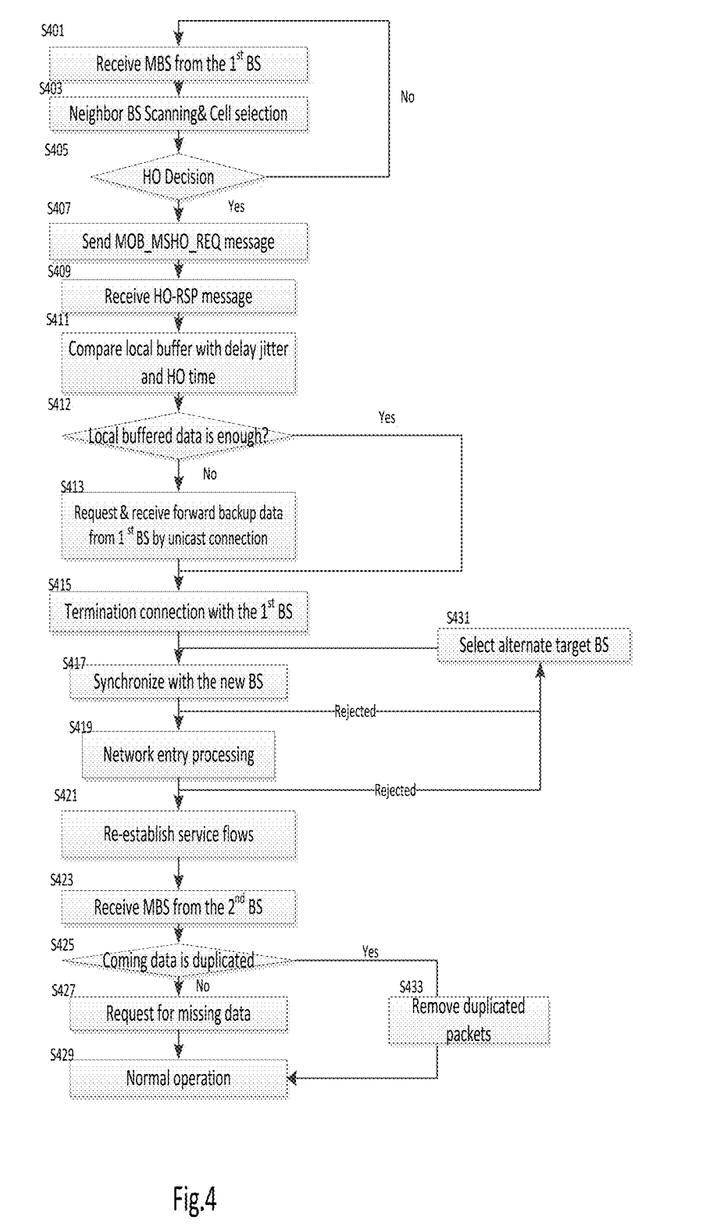
FIG. 4 is a diagram showing the detailed flow chart of the handover process in FIG. 3.

FIG. 4 shows the detailed flow chart of the proposed handover process based on the above explanation.

As shown in FIG. 4, in the step S401, the mobile station initially receives MBS data packets from the first base station BS1 which is its serving base station in this case.

Then in the step S403, the mobile station will scan the neighboring base stations and have a cell selection.

In the next step S405, the mobile station will decide whether to have the handover.

If the result of the step S405 is "No", the method will go back to the step S401 in which the mobile station will continue to receive MBS from the first base station. If the result of the step S405 is "Yes", the method will proceed to the next step S407 wherein the mobile station will send a MOB_M-SHO_REQ message to a target base station. It should be noted that the MOB_MSHO_REQ message is defined in the IEEE802.16e standard for the mobile station to request for a handover.

Then in the step S409 the mobile station will receive a HO_RSP message from the second base station BS2 as a response to the request. The HO_RSP is also a message defined in the IEEE802.16e standard.

In the next step S411, the mobile station will compare the amount of the MBS data packets in its buffer with a threshold value based on the delay jitter and the handover time and determine in the step S412 whether the local buffered data is sufficient for the handover.

If it is determined in the step S412 that local buffered MBS data is not sufficient for the handover (the amount is lower than the threshold value), the method will proceed to the next step S413 in which the mobile station will request and receive backup MBS data packets from the first base station BS1 through a unicast connection. If the step S412 determines that the local buffered MBS data is sufficient for the handover (amount reaches the threshold value), the method will initiate the handover process started from the step S415.

As shown in FIG. 4, the mobile station will terminate the connection with the first base station BS1 in the step S415 and then in the step S417 try to synchronize with a target base station (for example, the second base station BS2). Then in the following steps S419, S421 and S 423, the mobile station will go through the network entry procedure, re-establish service flows and the receive MBS data packets from the second base station BS2. It is shown in the FIG. 4 that in both steps S417 and S419 the mobile station might be rejected. In such cases, the method will go to the step S431 in which the mobile station will try to select an alternative target base station for handover.

After the mobile station starts to receive MBS data packets from the second base station BS2 in the step S423, the mobile station will compare the sequence number of packets stored in the backup buffer with the incoming new service packets in the step S425. If duplicated content packet is found, the backup buffer will be clean to remove the duplicated packets in the step S433. In this case there will be no service interruption during handover. Otherwise, the mobile station may have to request for the missing packet in the step S427, on which condition the service will be broken.

Figure 5:
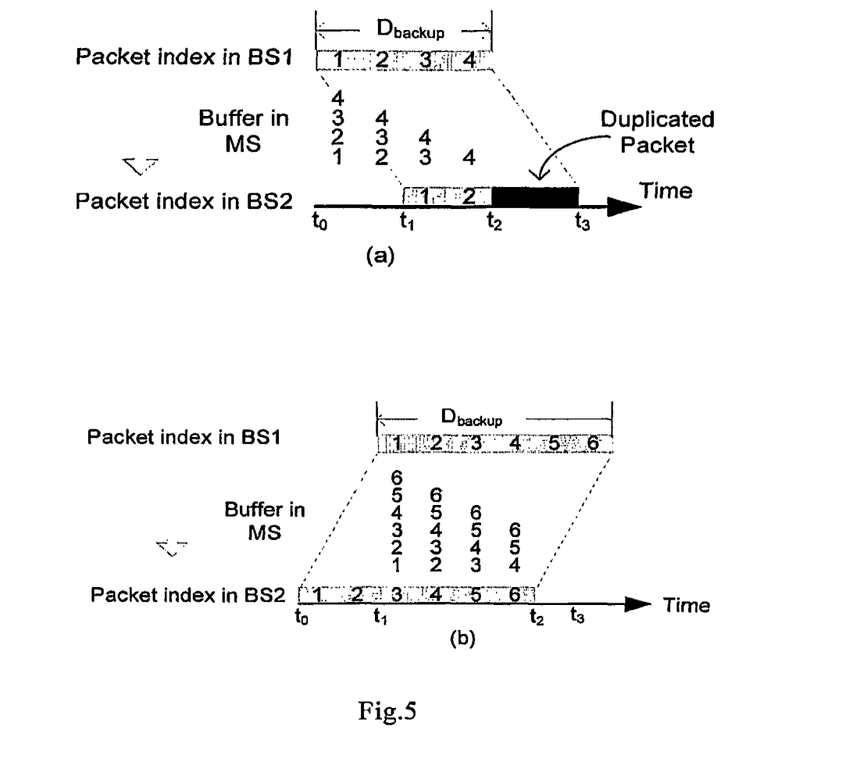
FIG. 5 is an exemplary diagram showing the buffer analysis between two un-synchronized MBS program for playback according to an embodiment of the invention.

FIG. 5 is an exemplary diagram showing the buffer analysis between two un-synchronized MBS programs for playback.

FIG. 5 will be described on the assumption that a mobile station stores a length of Dbackup before the handover from the first base station BS1 to the second base station BS2.

FIG. 5(a) shows the scenario where the service flow in the base station BS1 is ahead of the base station BS2 because its network transmission delay from MBS controller is smaller than that of the base station BS2. In the FIG. 5(a), $t_0$ and $t_1$ represent respectively the current transmit points in the base stations BS1 and BS2. So the network delay jitter T.network=$t_1$−$t_0$. If the mobile station starts the handover at the time point of $t_0$ and finishes the handover at $t_2$, then the handover time consumption T.ho=$t_2$−$t_0$. Assuming the time consumption of the handover is 4 time slots and the network delay jitter is 2 time slots, we can see from the FIG. 5(a) that 4 packets (equal to T.ho) are sufficient to avoid service broken during the handover. Some duplicated packets will be received after re-establishment of service connection with the base station BS2.

FIG. 5(b) shows the scenario where the content in the base station BS1 is transmitted behind of that in the base station BS2. In the FIG. 5(b), $t_0$ and $t_1$ represent respectively the current transmit points in the base stations BS2 and BS1. The mobile station starts the handover at the time point of $t_0$ and finishes the handover at $t_2$. It can be seen from the FIG. 5(b) that at least 6 packets (equal to T.network+T.ho) are required to be stored in advance in the buffer of the mobile station to guarantee the service continuity during the handover.

It can be appreciated from the FIG. 5 that, by pre-storing a predetermined amount of backup data packets calculated based on the statistic value of the network delay jitter and handover time before the handover, a seamless handover of a mobile station can be achieved to prevent the MBS service interruption during the handover.

According to another aspect of the embodiment, the MBS controller will also monitor the current queue depth of each base station and its variation over the calculated bottom line value Q.bottom. If any one of queue depth is lower than the Q.bottom, the MBS controller will increase its sending rate to guarantee that each base station has enough stored data. On the contrary, if any base station has a queue overflow, the MBS controller can decrease sending rate.

Figure 6:
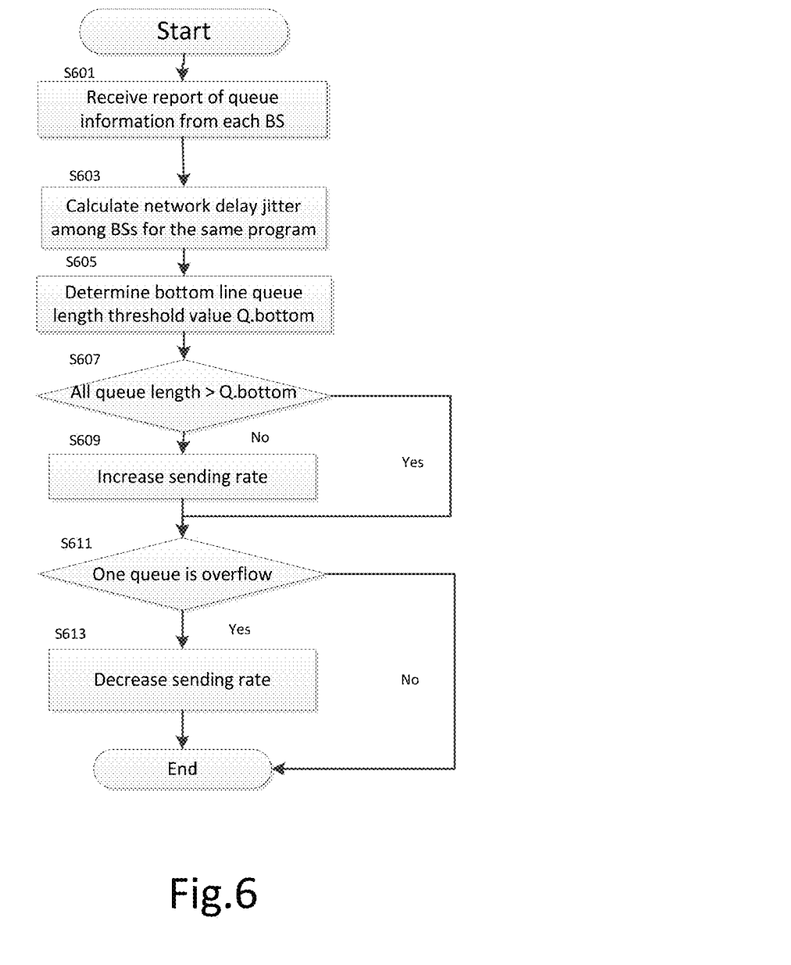
FIG. 6 is a flow chart showing the work flow of the source data rate controlling method of the MBS controller according to an embodiment of the invention.

FIG. 6 is a flow chart showing the work flow of the source data rate control method of the MBS controller according to the above described embodiment of the invention.

As shown in FIG. 6, in the step S601, the MBS controller will receive report of queue information from each base station, and then in the next step S603 calculate the network delay jitter among all the base stations for a program based on the received queue information.

In the next step S605, a threshold value of the bottom line of queue length Q.bottom is determined.

In the step S607, the MBS controller will determine whether all queue lengths of the base stations are larger than the Q.bottom. If the result is "No", then in the step S609, the MBS controller will increase the sending rate. Otherwise, the MBS controller will further determine, in the step S611, whether there is one queue overflow among all the base stations.

If the result of the step S611 is "Yes", then in the next step S613 the MBS controller will decrease the sending rate.

As described above, the invention proposes to buffer at a mobile station which is going to handover from a serving base station to a target base station with enough data packets to cover the possible loss during the handover. The threshold value of the buffered data packets is determined based on the network delay jitter which can be calculated by the variation of first packet index report from service queue in each base station and the statistical handover time consumption when a mobile station roams between base stations. Such information can be broadcasted in multi-base-station network through control message so that both base stations and mobile stations can be updated periodically.

Additionally, in the backbone network, the MBS controller can monitor the queue depth (in terms of playback time) of each base station. If the queue depth is lower than a threshold value which is also determined by the network delay jitter and the statistical handover time in a certain interval duration, the MBS controller can dynamically adjust the source data rate of a program so as to prepare enough data packets for forwarding to base stations which will be help to overcome the switching time for handover.

It is to be understood that numerous modifications may be made to the illustrative embodiments and that other arrangements may be devised without departing from the spirit and scope of the present invention as defined by the appended claims.

The invention claimed is:

1. A method of a mobile station receiving data packets from a serving base station via a multicast or broadcast connection in a wireless network for performing a handover from the serving base station to a target base station, the method comprises, performed by the mobile station:
   detecting a quantity of buffered data packets in the mobile station;
   upon the detection of the quantity of buffered data packets in the mobile station being lower than a first threshold value, establishing a unicast connection with the serving base station to receive the data packets from the serving base station; and
   upon the detection of the quantity of the buffered data packets reaching the first threshold value, performing a handover from the serving base station to the target base station;
   wherein the first threshold value is determined as a function of network delay jitter information of the wireless network and average handover time of mobile stations in the wireless network.

2. The method according to claim 1, further comprising receiving a message containing the network delay jitter information of the wireless network and average handover time of the mobile stations in the wireless network, the message being broadcasted in the wireless network.

3. The method according to claim 1, further comprising terminating the unicast connection upon detection of the level of buffered data packets reaching the first threshold value.

4. The method according to claim 1, wherein said data packets are for the multicast and the broadcast service.

5. A mobile station in a wireless network, the mobile station comprising:
   a buffer that buffers data packets received from a serving base station; and
   a processor configured to:
      detect a quantity of buffered data packets in the buffer;
      establish a unicast connection with the serving base station to receive data packets from the serving base station upon the detected quantity of buffered data packets being lower than a first threshold value;
      perform a handover from the serving base station to a target base station upon the detection of the quantity of buffered data packets reaching the first threshold value;

wherein the first threshold value is determined as a function of network delay jitter information of the wireless network and average handover time of mobile stations in the wireless network.

6. The mobile station according to claim 5, wherein the processor is further configured to receive a message containing the network delay jitter information of the wireless network and average handover time of the mobile stations in the wireless network, the message being broadcasted in the wireless network.

7. The mobile station according to claim 5, wherein the processor is further configured to terminate the unicast connection upon detection of the level of buffered data packets reaching the first threshold value.

8. The mobile station according to claim 5, wherein said data packets are for the multicast and the broadcast service.

* * * * *